UNITED STATES PATENT OFFICE.

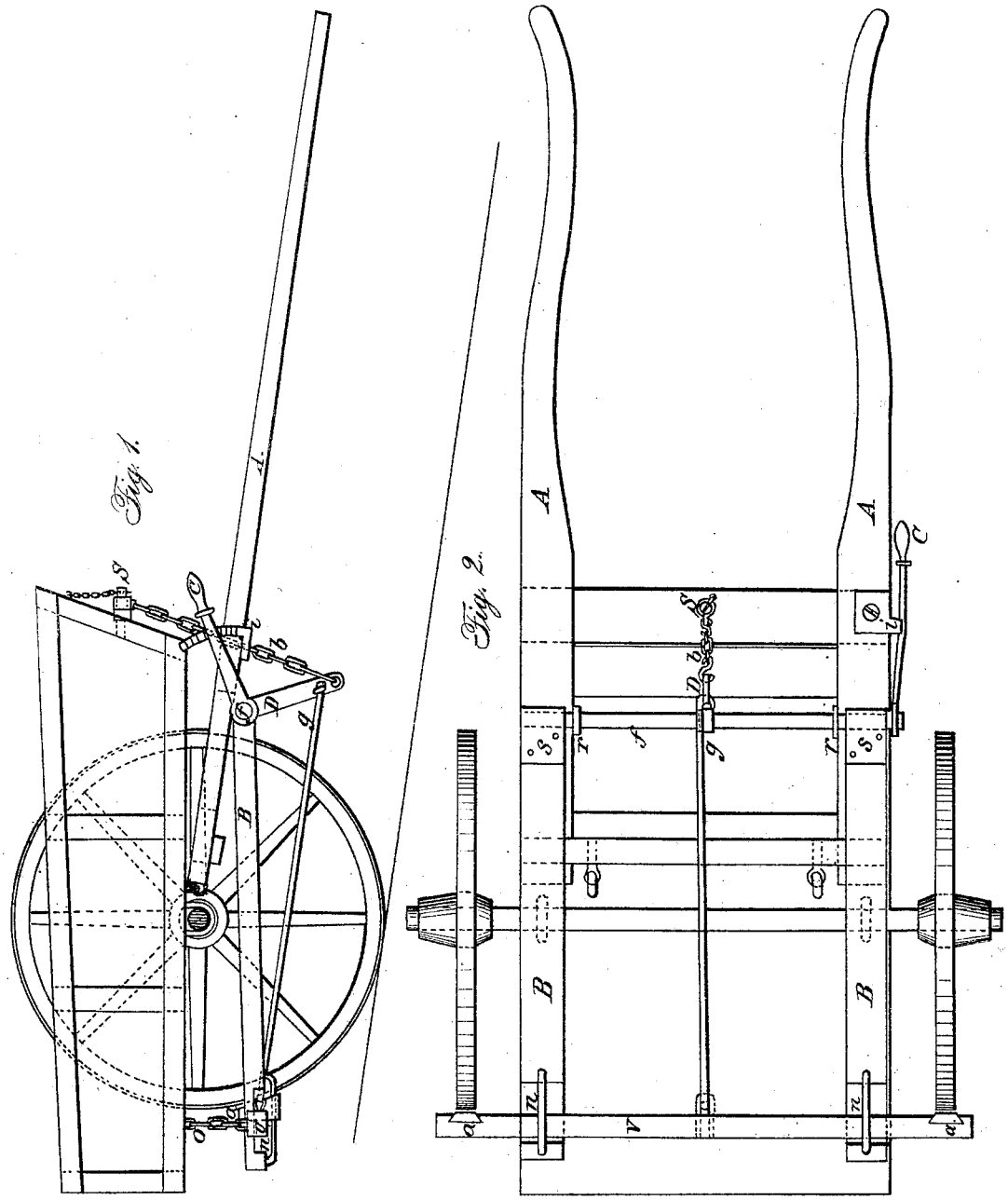
HOLCROFT & SMITH.
Carriage-Brake.
No. 50,248. Patented Oct. 3, 1865.
Witnesses:
John White
John Shinn
Inventor:
Henry Holcroft
C. L. Smith

HENRY HOLCROFT AND C. S. SMITH, OF MEDIA, PENNSYLVANIA.

IMPROVED BRAKE FOR CARTS.

Specification forming part of Letters Patent No. 50,248, dated October 3, 1865.

*To all whom it may concern:*

Be it known that we, HENRY HOLCROFT and C. S. SMITH, both of Media, in the county of Delaware and State of Pennsylvania, have invented certain new and useful Improvements in Carts; and we do hereby declare that the following is a full, clear, and exact description thereof, which will enable those skilled in the art to make and use the same, reference being had to the accompanying drawings, forming part of this specification, in which—

Figure 1 represents a sectional side elevation of our invention. Fig. 2 is an inverted plan of the same.

Similar letters of reference indicate corresponding parts.

The nature of our invention consists in the arrangement of a brake to a cart in such a manner as to balance the body of the cart on the axle and relieve the horse of the weight of the load in going downhill.

To enable others to make and use our improvement, we will now describe the construction and operation of the same.

A is the shafts or thills, which are constructed and fastened to the cart-body, but may be attached to the axle in the usual way. The body of the cart is also constructed and fastened to the axles in the usual manner. Under the shafts or thills is an iron shaft, $f$, and fastened to the thills by the ears $r$ $r$, Fig. 2. Fastened by means of the straps $s$ $s$ to this shaft are two pieces of timber, B B, extending to the rear of the wheels. These pieces are notched, $n$ $n$, to receive the beam $v$. This beam is made to move in the notches $n$ $n$, and held in place by straps, which should extend to the ends of the pieces B B and be made strong, so as to be able to receive the jar. In dumping the load of the cart the beam $v$ is hung to the rear of the cart-body by the chains $o$. On the shaft $f$ is an arm, D. This arm is connected to the beam $v$ by the rod $g$. The arm D is also connected to the front of the cart-body by the chain $b$. This chain is fastened to the stud S and held in place by the small pin attached to the small chain seen in Fig. 1. The handle C is fastened to the outer end of the shaft $f$ and fitted to the notches or ratchets in the lock-stand $i$ fastened to the thills or shafts A.

To put the brake in operation and at the same time relieve the horse from the weight of the load the handle C is raised in the notches on the lock-stand, which draws the brake-shoes $r$ $r$ against the periphery of the wheels, and at the same time the rear of the cart-body is drawn down and the front raised from the thills or shafts, which causes the load to balance on the axle, and the horse can go down a steep hill with great ease. In dumping the cart the small pin is taken out of the end of the stud S, and the end of the chain $b$ is removed from the stud S, which allows the cart to be dumped in the usual manner.

We claim as new and desire to secure by Letters Patent—

1. The liberation of the cart-body from the thills or shafts by the same arrangement and at the same time the brakes are put into action, as above described, or an equivalent arrangement of the same.

2. The pieces B B, supported by the shaft $f$ and chains $o$, as and for the above-described purpose.

HENRY HOLCROFT.
C. S. SMITH.

Witnesses:
JOHN WHITE,
JOHN SHINN.